US007997253B2

(12) United States Patent
Serra et al.

(10) Patent No.: US 7,997,253 B2
(45) Date of Patent: Aug. 16, 2011

(54) METHOD FOR CONTROLLING THE OVERPRESSURE IN A FUEL-SUPPLY SYSTEM OF A COMMON-RAIL TYPE

(75) Inventors: Gabriele Serra, San Lazzaro di Savena (IT); Matteo De Cesare, Torremaggiore (IT); Francesco Paolo Ausiello, Bologna (IT)

(73) Assignee: Magneti Marelli Powertrain, S.p.A., Corbetta (IT)

( * ) Notice: Subject to any disclaimer, the term of this patent is extended or adjusted under 35 U.S.C. 154(b) by 427 days.

(21) Appl. No.: 12/167,609

(22) Filed: Jul. 3, 2008

(65) Prior Publication Data

US 2009/0007885 A1 Jan. 8, 2009

(30) Foreign Application Priority Data

Jul. 5, 2007 (EP) .................................... 07425416

(51) Int. Cl.

| | |
|---|---|
| ***F02M 69/46*** | (2006.01) |
| ***B60T 7/12*** | (2006.01) |
| ***G05D 1/00*** | (2006.01) |
| ***G06F 17/00*** | (2006.01) |

(52) U.S. Cl. ......................... 123/456; 701/107; 123/479

(58) Field of Classification Search .................. 123/456, 123/457, 467, 494, 495, 511, 447, 198 D, 123/479; 701/107

See application file for complete search history.

(56) References Cited

U.S. PATENT DOCUMENTS

| | | | | |
|---|---|---|---|---|
| 5,711,274 | A | 1/1998 | Drummer | |
| 6,293,253 | B1 * | 9/2001 | Arnold et al. | 123/458 |
| 7,270,115 | B2 * | 9/2007 | Dolker | 123/467 |
| 2005/0199219 | A1 * | 9/2005 | Utsumi | 123/458 |

FOREIGN PATENT DOCUMENTS

| | | | |
|---|---|---|---|
| DE | 19908798 | A1 | 9/1999 |
| DE | 19917711 | A1 | 10/2000 |
| DE | 102005012997 | A1 | 9/2006 |
| EP | 0896144 | A | 2/1999 |
| EP | 1018600 | A | 7/2000 |

OTHER PUBLICATIONS

Etschmann, European Search Report for EP 07 42 5416, 3 pp., Jan. 18, 2008.

* cited by examiner

*Primary Examiner* — Erick Solis
*Assistant Examiner* — Sizo B Vilakazi
(74) *Attorney, Agent, or Firm* — Klarquist Sparkman, LLP

(57) ABSTRACT

A method for controlling the overpressure in a fuel-supply system of a common-rail type for an internal-combustion engine provided with a number of cylinders; the method has the steps of: supplying fuel under pressure to a common rail connected to a number of injectors by means of a high-pressure pump; detecting the effective value of the pressure of the fuel within the common rail; comparing the effective value of the pressure of the fuel within the common rail with a safety value; determining a condition of emergency if the effective value of the pressure of the fuel within the common rail is higher than the safety value; and driving, in the case of emergency, the injectors for discharging part of the fuel present in the common rail so as to contain the increase in pressure of the fuel within the common rail.

8 Claims, 4 Drawing Sheets

METHOD FOR CONTROLLING THE OVERPRESSURE IN A FUEL-SUPPLY SYSTEM OF A COMMON-RAIL TYPE

CROSS REFERENCE TO RELATED APPLICATIONS

This application claims the benefit of European Patent Application No. 07425416.0 filed Jul. 5, 2007, the entire contents of which hereby are incorporated by reference.

TECHNICAL FIELD

The present invention relates to a method for controlling the overpressure in a fuel-supply system of a common-rail type.

BACKGROUND ART

In current systems for direct injection of fuel of a common-rail type, a low-pressure pump supplies the fuel from a tank to a high-pressure pump, which in turn supplies the fuel to a common channel or “common rail”. Connected to the common rail are a series of injectors (one for each cylinder of the engine), which are cyclically driven so as to inject part of the fuel under pressure present in the common rail within the respective cylinders. For proper operation of combustion, it is important that the value of the pressure of the fuel within the common rail should always be kept at a desired value, which may generally vary as a function of the engine point.

In order to keep the value of the pressure of the fuel within the common rail at the desired value, it has been proposed to size the high-pressure pump to supply the common rail with an amount of fuel exceeding the effective consumption in every condition of operation. Coupled to the common rail is an electromechanical pressure regulator, which keeps the value of the pressure of the fuel within the common rail at the desired value by discharging the fuel in excess to a recirculation channel that re-introduces said excess fuel upstream of the low-pressure pump. An injection system of this type presents different drawbacks, in so far as the high-pressure pump must be sized for supplying to the common rail an amount of fuel that is slightly in excess of the maximum possible consumption. However, said condition of maximum possible consumption occurs somewhat rarely and in all the remaining conditions of operation the amount of fuel supplied to the common rail by the high-pressure pump is much greater than the actual consumption, and hence a considerable portion of said fuel must be discharged by the pressure regulator into the recirculation channel. The work performed by the high-pressure pump to pump the fuel that is subsequently discharged by the pressure regulator is “useless” work. Hence, this injection system presents a very low energy efficiency. Furthermore, this injection system tends to overheat the fuel, in so far as, when the fuel in excess is discharged by the pressure regulator into the recirculation channel, the fuel itself passes from a very high pressure to a substantially ambient pressure and, as a result of said pressure jump, heats up.

In order to solve the problems described above, it has been proposed to use a high-pressure pump with variable capacity capable of supplying the common rail only with the amount of fuel necessary for keeping the pressure of the fuel within the common rail at the desired value.

For example, the patent application No. EP0481964A1 describes a high-pressure pump provided with an electromagnetic actuator, which is able to vary instant by instant the capacity of the high-pressure pump by varying the instant of closing of an intake valve of the high-pressure pump itself In other words, the capacity of the high-pressure pump is varied by varying the instant of closing of the intake valve of the high-pressure pump itself. In particular, the capacity is decreased by delaying the instant of closing of the intake valve and is increased by anticipating the instant of closing of the intake valve.

A further example of a high-pressure pump with variable capacity is provided by the U.S. Pat. No. 6,116,870A1. The high-pressure pump described in U.S. Pat. No. 6,116,870A1 comprises a cylinder provided with a piston having a reciprocating motion within the cylinder, an intake channel, a delivery channel connected to the common rail, an intake valve designed to enable passage of a flow of fuel entering the cylinder, a unidirectional delivery valve coupled to the delivery channel and designed to enable just a flow of fuel out of the cylinder, and a regulation device coupled to the intake valve to keep the intake valve open during a step of compression of the piston and hence enable a flow of fuel from the cylinder through the intake channel. The intake valve comprises a valve body that can move along the intake channel and a valve seat, which is designed to be engaged in a fluid-tight way by the valve body and is set at the end of the intake channel opposite to the end communicating with the cylinder. The regulation device comprises a control element, which is coupled to the valve body and is mobile between a passive position, in which it allows the valve body to engage in a fluid-tight way the valve seat, and an active position, in which it does not allow the valve body to engage the valve seat in a fluid-tight way. Coupled to the control element is an electromagnetic actuator, which is designed to displace the control element between the passive position and the active position.

In the case of (mechanical, electrical or electronic) malfunctioning of the variable-capacity high-pressure pump, the variable-capacity high-pressure pump itself could supply the common rail with an amount of fuel much higher than the necessary amount, thus causing a fast rise in the pressure of the fuel within the common rail. Once said situation of malfunctioning of the high-pressure pump has been detected, the low-pressure pump is immediately turned off in order to interrupt flow of fuel to the high-pressure pump and hence block the uncontrolled increase in the pressure of the fuel within the common rail. However, turning-off of the low-pressure pump has effect with a certain delay (equal to a certain number of pumping cycles of the high-pressure pump), and hence, without any further interventions of limitation, the pressure of the fuel within the common rail could reach values higher than the maximum value that can be physically withstood by the components of the injection system, with consequent failure of said components and outflow of fuel at a high pressure into the engine compartment. In order to limit the maximum pressure of the fuel within the common rail in the event of malfunctioning of the high-pressure pump, in known injection systems there is always present an electromechanical pressure regulator controlled by a control unit or else a mechanical pressure limiter.

However, coupling of an electromechanical pressure regulator or a mechanical pressure limiter to the common rail with the corresponding pipes for relief into the tank entails a non-negligible cost both in terms of purchase of the components and in terms of installation of said components; said cost is far from justified by the sporadic nature of the cases of intervention (i.e., cases of malfunctioning of the high-pressure pump that cause a sudden increase in the pressure of the fuel within the common rail).

DISCLOSURE OF INVENTION

The aim of the present invention is to provide a method for controlling the overpressure in a fuel-supply system of a common-rail type, said control method being free from the drawbacks described above and, in particular, being easy and inexpensive to implement.

Provided according to the present invention is a method for controlling the overpressure in a fuel-supply system of a common-rail type according to what is recited in the attached claims.

BRIEF DESCRIPTION OF THE DRAWINGS

The present invention will now be described with reference to the annexed drawings, which illustrate a non-limiting example of embodiment thereof, wherein.

PREFERRED EMBODIMENTS OF THE INVENTION

Figure 1:
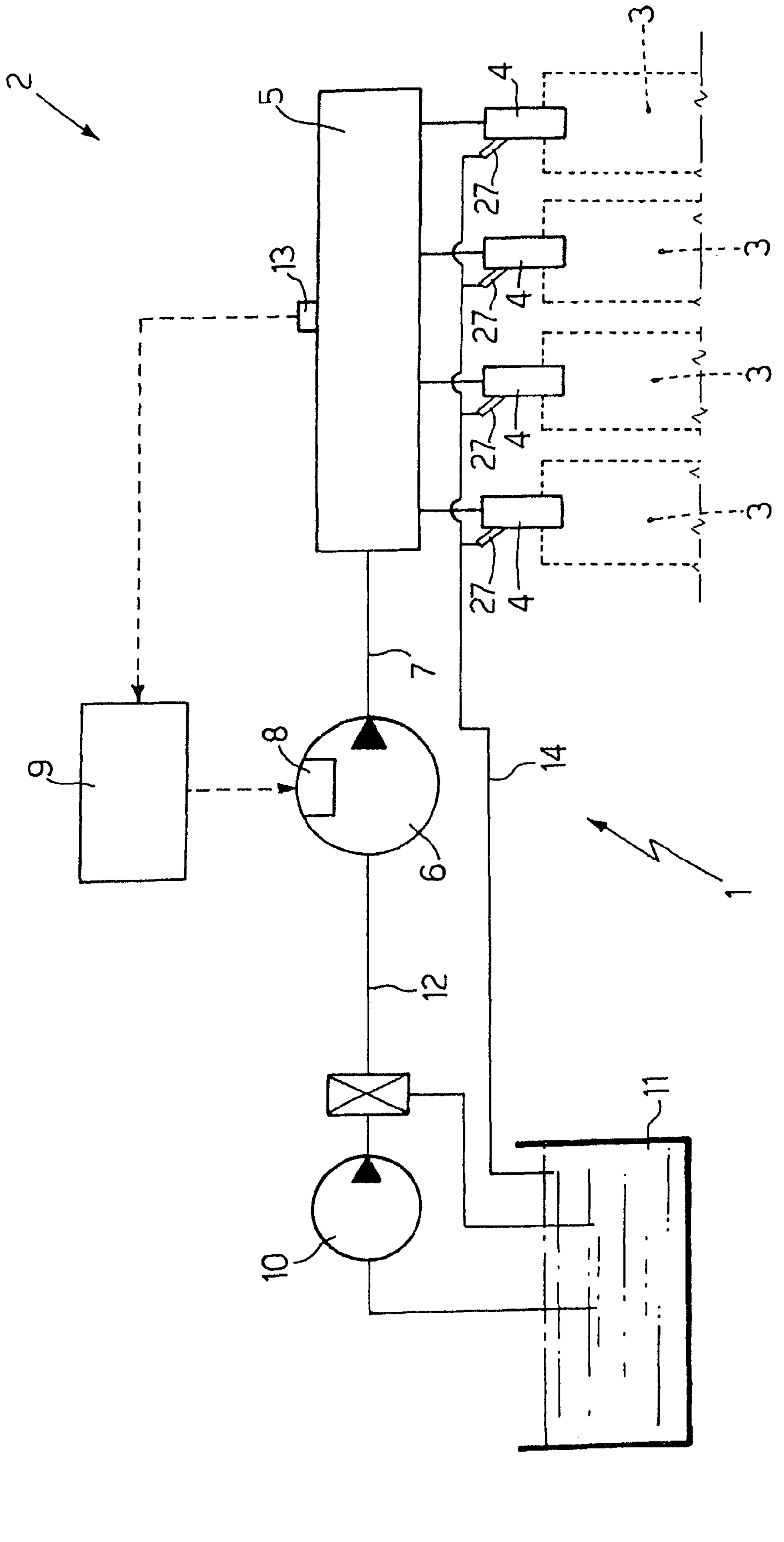
FIG. 1 is a schematic view of a system for direct injection of fuel of a common-rail type that implements the control method forming the subject of the present invention.

In FIG. 1, the reference number 1 designates as a whole a system of a common-rail type for direct injection of fuel into an internal-combustion engine 2 provided with four cylinders 3. The injection system 1 comprises four injectors 4, each of which is designed to inject the fuel directly within a respective cylinder 3 of the engine 2 and receives the fuel under pressure from a common rail 5.

A high-pressure pump 6 supplies fuel to the common rail 5 by means of a pipe 7 and is provided with a device 8 for regulating the flow rate, said device being governed by a control unit 9, designed to keep the pressure of the fuel within the common rail 5 at a desired value, which generally varies in time as a function of the engine point (i.e., of the conditions of operation of the engine 2). By way of example, the regulation device 8 comprises an electromagnetic actuator (not illustrated), which is able to vary instant by instant the flow rate $m_{HP}$ of fuel of the high-pressure pump 6 by varying the instant of closing of an intake valve (not illustrated) of the high-pressure pump 6 itself. In particular, the flow rate $m_{HP}$ of fuel is decreased by delaying the instant of closing of the intake valve (not illustrated) and is increased by anticipating the instant of closing of the intake valve (not illustrated).

A low-pressure pump 10 with substantially constant capacity supplies the fuel from a tank 11 to the high-pressure pump 6 by means of a pipe 12.

The control unit 9 regulates the flow rate $m_{HP}$ of fuel of the high-pressure pump 6 by means of a feedback control using as feedback variable the value of the pressure of the fuel within the common rail 5, said pressure value being detected in real time by a sensor 13.

Each injector 4 is governed cyclically by the control unit 9 so that it will inject the fuel into a respective cylinder 3 of the engine. The injectors 4 have a hydraulic actuation of the needle and are hence connected to an exhaust channel 14, which has a pressure that is a little higher than the ambient pressure and which gives out upstream of the low-pressure pump 10, typically inside the tank 11.

Figure 2:
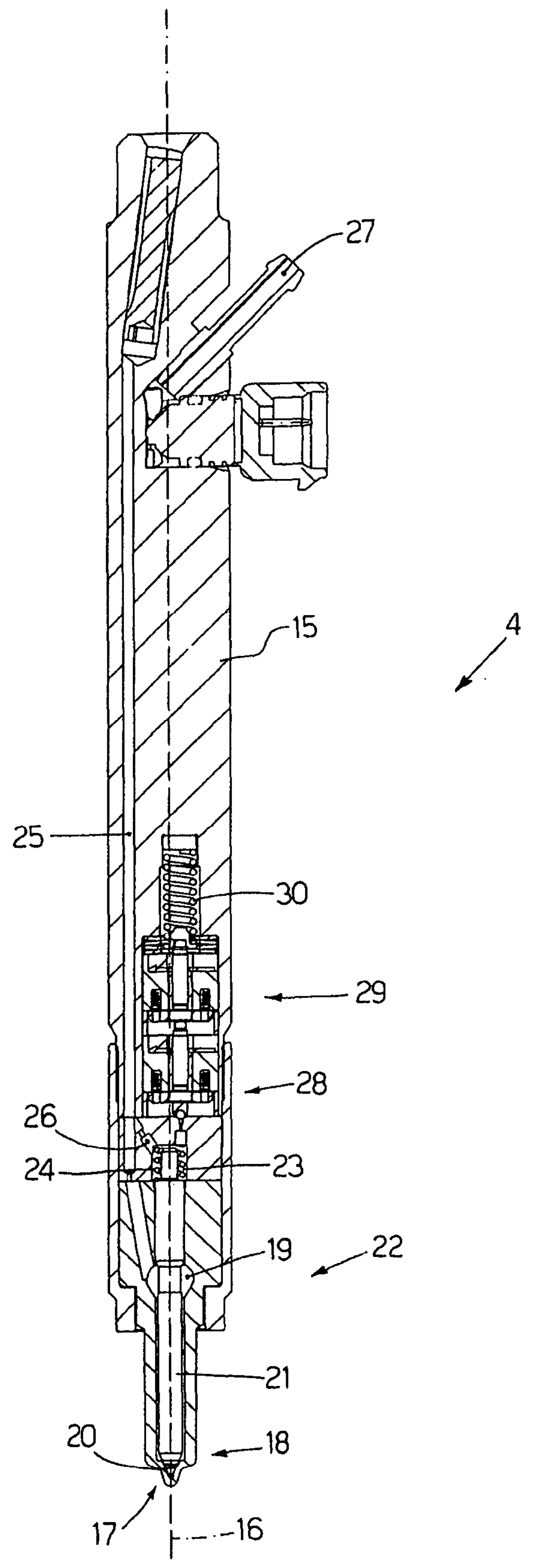
FIG. 2 is a schematic view, in side elevation and sectioned, of a fuel injector of the system for direct injection of fuel of FIG. 1.
Figure 3:
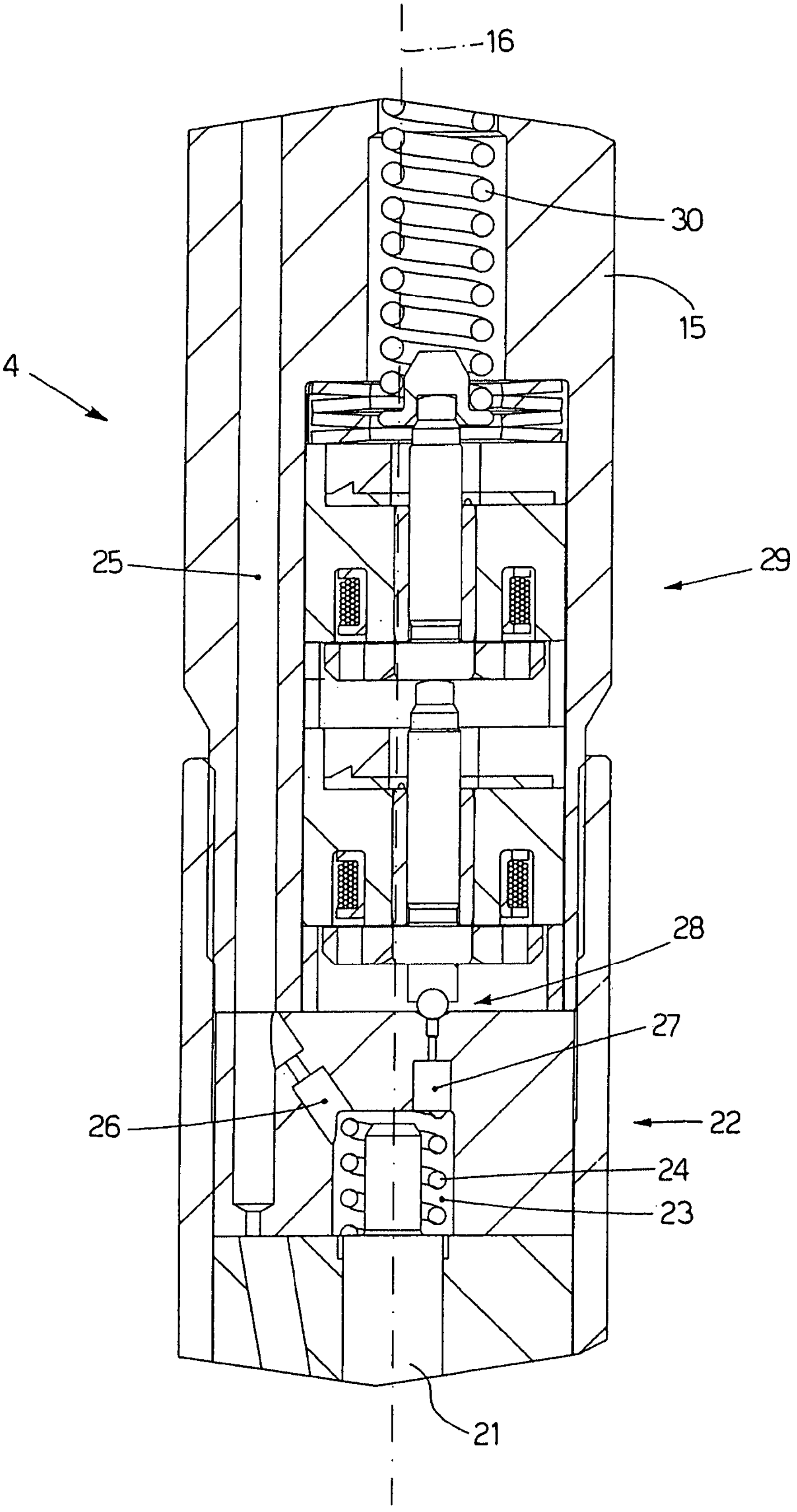
FIG. 3 is a view at an enlarged scale of a detail of FIG. 2.

According to what is illustrated in FIGS. 2 and 3, each injector 4 of fuel is housed in a cylindrical body 15 having a longitudinal axis 16 and is governed so as to inject fuel from an injection nozzle 17 regulated by an injection valve 18. Made within the cylindrical body 15 is an injection chamber 19, which is delimited at the bottom by a valve seat 20 of the injection valve 18 and houses in a slidable way a bottom portion of a needle 21 of the injection valve 18, in such a way that the needle 21 will be able to displace along the longitudinal axis 16 under the thrust of a hydraulic actuator device 22 between a position of closing and a position of opening of the valve seat 20.

A top portion of the needle 21 is housed in a control chamber 23 and is coupled to a spring 24, which exerts on the needle 21 itself a force directed downwards that tends to keep the needle 21 itself in the closing position.

The cylindrical body 15 moreover has a supply channel 25, which starts from a top end of the cylindrical body 15 and supplies the fuel under pressure to the injection chamber 19. Branching off from the supply channel 25 is a further supply channel 26, which is designed to set the supply channel 25 in communication with the control chamber 23 for supplying the fuel under pressure also to the control chamber 23.

Starting from the control chamber 23 is an exhaust pipe 27, which gives out into a top portion of the cylindrical body 15 and sets the control chamber 23 in communication with the exhaust channel 14. The exhaust pipe 27 is regulated by a control valve 28, which is set in the proximity of the control chamber 23 and is controlled by an electromagnetic actuator 29 between a closing position, in which the control chamber 23 is isolated from the exhaust pipe 27, and an opening position, in which the control chamber 23 is connected to the exhaust pipe 27. The electromagnetic actuator 29 comprises a spring 30, which tends to keep the control valve 28 in the closing position.

The section of the supply channel 26, the section of the control valve 28, and the section of the exhaust pipe 27 are sized with respect to the section of the supply channel 25 in such a way that, when the control valve 28 is open, the pressure of the fuel in the control chamber 23 will drop to much lower values as compared to the pressure of the fuel in the injection chamber 19 and in such a way that the flow rate of fuel that flows through the exhaust pipe 27 is a fraction of the flow rate of fuel that flows through the injection nozzle 17.

In use, when the electromagnetic actuator 29 is de-energized, the force generated by the spring 30 keeps the control valve 28 in the closing position. Thus, the pressure of the fuel in the control chamber 23 is the same as the pressure of the fuel in the injection chamber 19 as a result of the supply channel 26. In this situation, the force generated by the spring 24 and the hydraulic force generated by the imbalance of the useful areas of the needle 21, to the advantage of the control chamber 23 with respect to the injection chamber 19, keep the injection valve 18 in the closing position.

When the electromagnetic actuator 29 is energized, the control valve 28 is brought into the opening position against the force of the spring 30. Hence the control chamber 23 is set in communication with the exhaust channel 14, and the pressure of the fuel in the control chamber 23 drops to much lower values as compared to the pressure of the fuel in the injection chamber 19. As has been said previously, the difference between the pressures of the fuel in the injection chamber 19 and in the control chamber 23 is due to the sizing of the sections of the supply channel 26, of the control valve 28, and of the exhaust pipe 27 with respect to the section of the supply channel 25.

As a result of the imbalance between the pressures of the fuel in the injection chamber 19 and in the control chamber 23, on the needle 21 a hydraulic force is generated, which displaces the needle 21 upwards against the action of the spring 24 so as to bring the injection valve 18 into the opening position and enable injection of the fuel through the injection nozzle 17.

When the electromagnetic actuator 29 is de-energized, the force generated by the spring 30 brings the control valve 28 into the closing position. Hence, the pressure of the fuel in the control chamber 23 tends to rise until it reaches the pressure of the fuel in the injection chamber 19. In this situation, the force generated by the spring 24 and the hydraulic force generated by the imbalance of the useful areas of the needle 21, to the advantage of the control chamber 23 with respect to the injection chamber 19, bring the injection valve 18 into the aforementioned closing position.

Preferably, the supply channel 26 has a restricted portion to obtain an instantaneous increase in the difference of pressure between the control chamber 23 and the injection chamber 19 during the transient of closing of the needle 21 (i.e., when the needle 21 passes from the opening position to the closing position) so as to increase the force acting on the needle 21 and, hence, speed up closing of the needle 21 itself.

From what has been set forth above, it is clear that, when the electromagnetic actuator 29 of an injector 4 is controlled, initially the control valve 28 is opened, and the fuel present in the control chamber 23 starts to flow through the exhaust pipe 27 and towards the exhaust channel 14. After a certain time interval from opening of the control valve 28, on the needle 21 a force of thrust of a hydraulic nature is generated, which causes opening of the injection valve 18 and hence supply of fuel through the injection nozzle 17.

In other words, the supply of fuel through the injection nozzle 17 occurs only if the electromagnetic actuator 29 of an injector 4 is controlled for a time interval longer than a threshold value $ET_{min}$. Instead, if the electromagnetic actuator 29 of an injector 4 is controlled for a time interval lower than the threshold value $ET_{min}$, then there may occur opening of the control valve 28 and consequent outflow of fuel to the exhaust channel 14, but no supply of fuel through the injection nozzle 17 occurs. Obviously, if the electromagnetic actuator 29 of an injector 4 is controlled for a time interval that is extremely short and much shorter than the threshold value $ET_{min}$, then not even opening of the control valve 28 occurs.

The threshold value $ET_{min}$ of an injector 4 is linked to the characteristics, tolerances, and ageing of the components of the injector 4 itself. Consequently, the threshold value $ET_{min}$ can vary (slightly) from injector 4 to injector 4 and, for one and the same injector 4, can also vary (slightly) during the life of the injector 4 itself. Furthermore, the threshold value $ET_{min}$ of an injector 4 can vary in a way inversely proportional also to the value of the pressure of the fuel in the common rail 5, i.e., the higher the pressure of the fuel in the common rail 5, the lower the threshold value $ET_{min}$.

With reference to FIG. 1, the control unit 9 determines instant by instant a desired value of the pressure of the fuel within the common rail 5 as a function of the engine point and consequently acts in order for the effective value of the pressure of the fuel within the common rail 5 to follow the desired value rapidly and precisely.

The variation dP/dt of the pressure of the fuel within the common rail 5 is given by the following state equation of the common rail 5:

$$dP/dt=(k_b/Vr)\times(m_{HP}-m_{Inj}-m_{Leak}-m_{BackFlow}) \quad [1]$$

where dP/dt is the variation of the pressure of the fuel within the common rail 5;

$k_b$ is the bulk modulus of the fuel;

Vr is the volume of the common rail 5;

$m_{HP}$ is the flow rate of fuel of the high-pressure pump 6;

$m_{Inj}$ is the flow rate of fuel injected into the cylinders 3 by the injectors 4;

$m_{Leak}$ is the flow rate of fuel lost by leakage from the injectors 4;

$m_{BackFlow}$ is the flow rate of fuel absorbed by the injectors 4 for their actuation and discharged into the exhaust channel 14.

From the above equation, it emerges clearly that the variation dP/dt of the pressure of the fuel within the common rail 5 is positive if the flow rate $m_{HP}$ of fuel of the high-pressure pump 6 is greater than the sum of the flow rate $m_{Inj}$ of fuel injected into the cylinders 3 by the injectors 4, of the flow rate $m_{Leak}$ of fuel lost owing to leakage from the injectors 4, and of the flow rate $m_{BackFlow}$ of fuel absorbed by the injectors 4 for their actuation and discharged into the exhaust channel 14. It should be noted that the flow rate $m_{Inj}$ of fuel injected into the cylinders 3 by the injectors 4 and the flow rate $m_{BackFlow}$ of fuel absorbed by the injectors 4 for their actuation and discharged into the exhaust channel 14 are extremely variable (they can even be zero) according to the modalities of control of the injectors 4, whereas the flow rate $m_{Leak}$ of fuel lost owing to leakage from the injectors 4 is quite constant (it presents only a slight increase as the pressure of the fuel within the common rail 5 increases) and is always present (i.e., it is never zero).

When the control unit 9 detects a condition of emergency, i.e., the presence of malfunctioning of the high-pressure pump 6, which causes a sudden increase in the pressure of the fuel within the common rail 5 (for example, said control unit 9 detects, by means of the pressure sensor 13, an unexpected and sudden increase of the pressure of the fuel in the common rail 5), the control unit 9 itself turns off the low-pressure pump 10 immediately to stop supply of the high-pressure pump 6 (i.e., to interrupt the flow of fuel to the high-pressure pump 6). Furthermore, in order to prevent the pressure of the fuel within the common rail 5 from exceeding a safety value that guarantees tightness and integrity of the injection system 1, the control unit 9 governs the injectors 4 (i.e., it energizes the electromagnetic actuators 29 of the injectors 4) to discharge part of the fuel present in the common rail 5, i.e., to increase the flow rate $m_{BackFlow}$ of fuel absorbed by the injectors 4 for their actuation and discharged into the exhaust channel 14 and possibly also to increase the flow rate $m_{Inj}$ of fuel injected into the cylinders 3 by the injectors 4 as compared to the flow rate necessary for generation of the torque required by the engine control.

In other words, according to the increase in pressure of the fuel present in the common rail 5, the control unit 9 decides whether in order to contain said increase it is sufficient to increase the flow rate $m_{BackFlow}$ of fuel absorbed by the injectors 4 for their actuation and discharged into the exhaust channel 14 or else whether it is necessary also to increase the flow rate $m_{Inj}$ of fuel injected into the cylinders 3 by the injectors 4 with respect to the flow rate necessary for generation of the torque required by the engine control. Obviously, the higher the increase in pressure of the fuel present in the common rail 5 (i.e., the higher the flow rate $m_{HP}$ of fuel of the high-pressure pump 6 is than the actual needs), the more likely it is that, in order to contain said increase, the control unit 9 will also have to increase the flow rate $m_{Inj}$ of fuel injected into the cylinders 3 by the injectors 4 with respect to the flow rate necessary for generation of the torque required by the engine control.

In order to increase the flow rate $m_{BackFlow}$ of fuel absorbed by the injectors 4 for their actuation and discharged into the exhaust channel 14, the control unit 9 drives the injectors 4 (i.e., it energizes the electromagnetic actuators 29 of the injectors 4) with a train of pulses, each of which has a driving time interval $ET_{red}$ close to, but shorter than, the respective threshold values $ET_{min}$ when the injectors 4 themselves are not used for injection of the fuel required by the process of combustion. In this way, no injection of fuel into the cylinders 3 is made, but the flow rate $m_{BackFlow}$ of fuel absorbed by the injectors 4 for their actuation and discharged into the exhaust channel 14 is increased. It should be emphasized that the driving time interval $ET_{red}$ with which each injector 4 is driven must be shorter than the threshold value $ET_{min}$, but must not be excessively shorter than the threshold value $ET_{min}$. Otherwise, the amount of fuel that is discharged into the exhaust channel 14 is far from significant and even zero. In other words, said control strategy envisages a series of micro-actuations of the injectors 4 when the injectors 4 themselves are not used for injection of the fuel required by the combustion process.

The duration of the driving time interval $ET_{red}$ of each injector 4 generally depends upon the pressure of the fuel within the common rail 5 and must always be shorter than the threshold value $ET_{min}$ in order to prevent undesirable fuel injection within the cylinders 3. Since, as has been said previously, the threshold value $ET_{min}$ can vary from injector 4 to injector 4 as well as during the life of a given injector 4, it is preferable to implement in the control unit 9 an algorithm of optimization of the duration of the driving time interval $ET_{red}$ of each injector 4 in order to prevent said driving time interval $ET_{red}$ from possibly exceeding the threshold value $ET_{min}$.

In order to increase the flow rate $m_{Inj}$ of fuel injected into the cylinders 3 by the injectors 4 with respect to the flow rate necessary for generation of the torque required by the engine control, the control unit 9 carries out supplementary openings of the injectors 4 preferably when said supplementary openings do not give rise to any combustion and hence to any delivery of undesired torque. For example, the control unit 9 could perform the supplementary openings of the injectors 4 only during the step of exhaust of the cylinders 3 (or also during the terminal part of the expansion step). In fact, during the step of exhaust of each cylinder 3 the fuel that is injected into the cylinder 3 itself does not burn (hence, it does not cause any generation of undesired torque) and is immediately expelled into the exhaust system.

In particularly critical situations (typically when malfunctioning of the high-pressure pump 6 arises during a cut-off step in which the flow rate $m_{Inj}$ of fuel injected into the cylinders 3 by the injectors 4 is normally zero), in order to limit adequately the increase in the pressure of the fuel present in the common rail 5, it might not be sufficient to perform supplementary openings of the injectors 4 only when said supplementary openings do not give rise to any combustion and hence to delivery of undesired torque. In this case, it may be useful to reduce (by appropriately controlling the throttle valve that regulates the flow rate of intake air) the flow of air taken in by the cylinders 3 in such a way as to prevent in any case combustion of the supplementary fuel injected into the cylinders 3 during the supplementary openings on account of lack of combustion air.

It should be noted that the reduction in the flow rate of air taken in by the cylinders 3 is useful not only for preventing, on account of lack of combustion air, combustion of the supplementary fuel within the cylinders 3, but also for preventing, on account of lack of combustion air, combustion of the supplementary fuel within the exhaust system. In this way, it is possible to prevent an excessive overtemperature in the exhaust system that could damage the exhaust system itself.

To sum up what has been described above, when the control unit 9 detects an unexpected and sudden increase in the pressure of the fuel in the common rail 5, the control unit 9 itself immediately turns off the low-pressure pump 10 to stop supply to the high-pressure pump 6. Furthermore, in order to prevent the pressure of the fuel within the common rail 5 from exceeding a safety value that guarantees tightness and integrity of the injection system 1, the control unit 9 drives the injectors 4 for discharging part of the fuel present in the common rail 5 by imparting on the injectors 4 a burst of micro-actuations that will be able to increase the flow rate $m_{BackFlow}$ of fuel absorbed by the injectors 4 for their actuation and possibly by carrying out supplementary openings of the injectors 4 preferably during the step of exhaust of the cylinders 3. If the control unit 9 carries out supplementary openings of the injectors 4, then the control unit 9 itself closes the throttle valve that regulates the flow rate of intake air so as to reduce the flow rate of air taken in by the cylinders 3 in such a way as to prevent in any case combustion of the supplementary fuel injected into the cylinders 3 during the supplementary openings on account of lack of combustion air.

Figure 4:
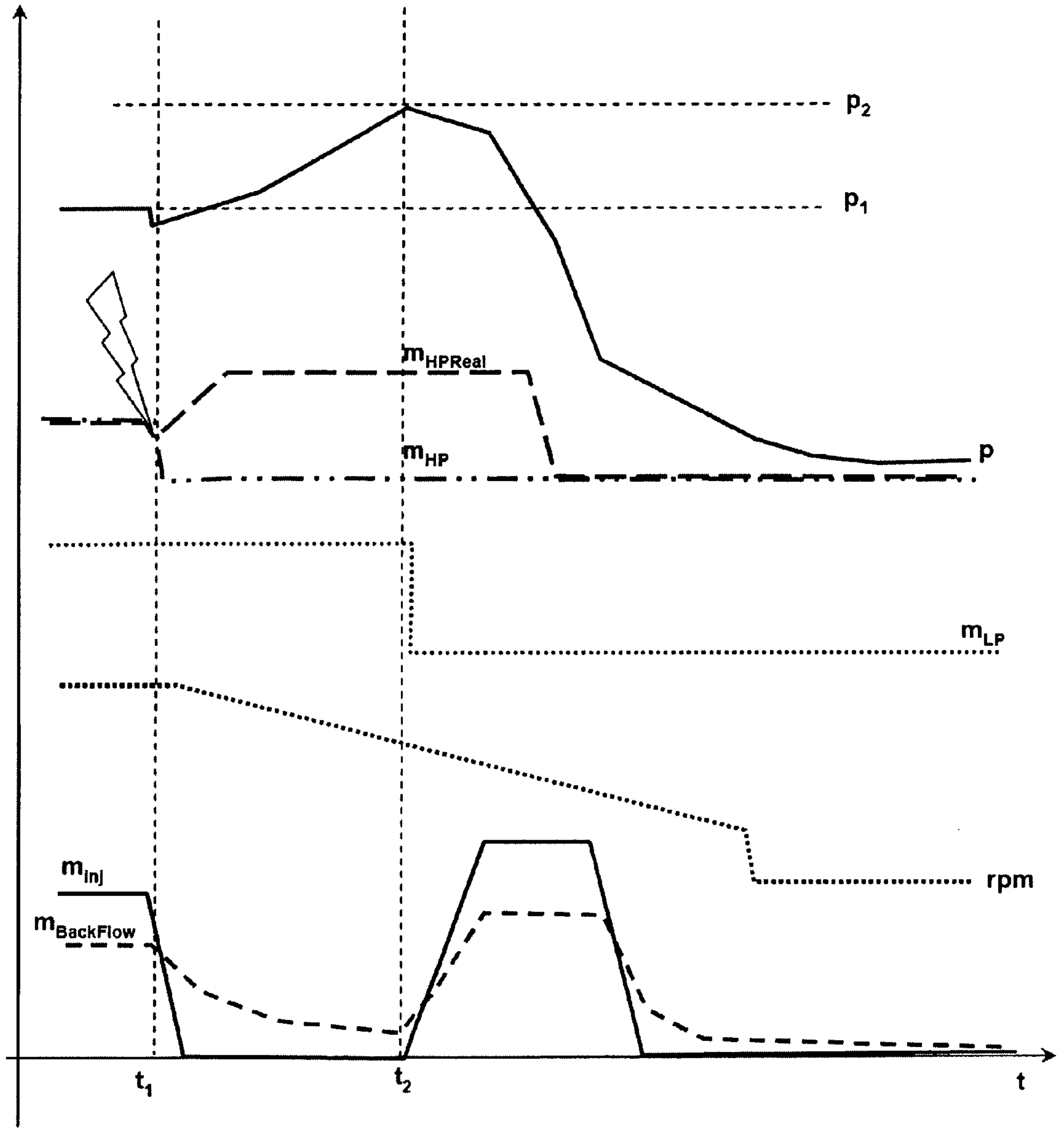
FIG. 4 is a graph that shows schematically the time plot of some quantities of the system for direct injection of fuel of FIG. 1 during a malfunctioning of a high-pressure pump.

What has been set forth above is represented schematically in the graph of FIG. 4, where at the instant $t_1$ the high-pressure pump 6 presents malfunctioning, which causes an irregular increase in the flow rate $m_{HP}$ of fuel of the high-pressure pump 6. In FIG. 4, $m_{HP}$ designates the expected flow rate of fuel of the high-pressure pump 6, whilst $M_{Phil}$ is the effective flow rate of fuel of the high-pressure pump 6. Following upon malfunctioning of the high-pressure pump 6, the pressure of the fuel in the common rail 5 (designated by p in FIG. 4) increases from a value $p_1$, which is the desired working value, until it reaches a value $p_2$, which is the intervention threshold of the emergency procedure described above. When the pressure of the fuel in the common rail 5 reaches the value $p_2$, which is the intervention threshold of the emergency procedure described above, the control unit 9 turns the low-pressure pump 10 off ($m_{LP}$ is the flow rate of fuel of the low-pressure pump 10) and drives the injectors 4 in order to increase the flow rate $m_{BackFlow}$ of fuel absorbed by the injectors 4 for their actuation and discharged into the exhaust channel 14 and to increase the flow rate $m_{Inj}$ of fuel injected into the cylinders 3 by the injectors 4. In FIG. 4 rpm is the r.p.m. of the engine 2.

As has been said previously, the control unit 9 intervenes by turning off the low-pressure pump 10 and limiting the pressure of the fuel within the common rail 5 when it detects the presence of malfunctioning of the high-pressure pump 6, which causes a sudden increase in the pressure of the fuel within the common rail 5 itself. A similar intervention is made by the control unit 9 also when the control unit 9 itself detects malfunctioning of the pressure sensor 13, which makes it impossible to know with adequate precision the pressure of the fuel within the common rail 5.

The control strategy described above for managing an emergency situation linked to malfunctioning of the high-pressure pump 6 presents the advantage of being particularly effective in containing the increase in the pressure of the fuel in the common rail 5, at the same time being extremely inexpensive to implement in so far as it uses only components normally present in a modern engine with direct injection of the fuel. In other words, it is no longer necessary to associate to the common rail 5 an electromechanical pressure regulator or a mechanical pressure limiter for limiting the pressure of the fuel in the common rail 5 in the case of emergency in so far as said limitation is obtained with the same degree of effectiveness by means of the control of the injectors 4 described above.

The invention claimed is:

1. A method for controlling the overpressure in a fuel-supply system of a common-rail type for an internal-combustion engine provided with a number of cylinders;

the method comprising:

supplying fuel under pressure, by means of a high-pressure pump, to a common rail connected to a number of injectors, each of which has a hydraulic actuation of the needle and absorbs for its actuation a flow rate ($m_{BackFlow}$) of fuel, which is discharged into an exhaust channel;

detecting the effective value of the pressure of the fuel within the common rail;

comparing the effective value of the pressure of the fuel within the common rail with a safety value of the pressure of the fuel within the common rail;

determining a condition of emergency if the effective value of the pressure of the fuel within the common rail is higher than the safety value of the pressure of the fuel within the common rail;

driving, in the case of emergency, the injectors for discharging part of the fuel present in the common rail without increasing the flow rate of fuel injected into the cylinders by increasing the flow rate ($m_{BackFlow}$) of fuel absorbed by the injectors for their actuation and without any supplementary opening so as to contain the increase in the pressure of the fuel within the common rail;

deciding, in the case of emergency, whether in order to contain the increase in the pressure of the fuel within the common rail it is sufficient to increase the flow rate ($m_{BackFlow}$) of fuel absorbed by the injectors for their actuation; and driving, in the case of emergency, the injectors also for increasing a flow rate ($m_{Inj}$) of fuel injected into the cylinders with respect to the flow rate necessary for generation of the torque required by the engine control when it is not sufficient to increase the flow rate ($m_{Backflow}$) of fuel absorbed by the injectors for their actuation.

2. The method according to claim 1, wherein the high-pressure pump receives the fuel from a low-pressure pump, in the case of emergency, there being envisaged the further step of turning off the low-pressure pump.

3. The method according to claim 1, wherein, in the case of emergency, supplementary openings of the injectors are made when said supplementary openings do not give rise to combustion and hence to delivery of undesired torque.

4. The method according to claim 3, wherein the supplementary openings of the injectors are made during the step of exhaust of the cylinders and during the terminal part of the step of expansion of the cylinders.

5. The method according to claim 1 and comprising the further step of reducing, in the case of emergency, the flow rate of air taken in by the cylinders when the injectors are driven for increasing the flow rate of fuel injected into the cylinders with respect to the flow rate necessary for generation of the torque required by the engine control.

6. The method according to claim 1 wherein, in the case of emergency, the injectors are preferably driven only for increasing the flow rate ($m_{BackFlow}$) of fuel absorbed by the injectors themselves for their actuation and, only in the case of need, are also driven for increasing the flow rate ($m_{Inj}$) of fuel injected into the cylinders with respect to the flow rate necessary for the generation of the torque required by the engine control.

7. The method according to claim 1 and comprising the further steps of:

determining for the injectors a threshold value ($ET_{min}$) so that each injector does not make any injection of fuel if it is driven for a time interval shorter than the threshold value ($ET_{min}$); and increasing, in the case of emergency, the flow rate ($m_{BackFlow}$) of fuel absorbed by the injectors for their actuation by driving the injectors themselves for a driving time interval ($ET_{red}$) shorter than the threshold value ($ET_{min}$) when the injectors themselves are not used for the injection of the fuel required by the process of combustion.

8. The method according to claim 1, wherein the condition of emergency is determined even when a malfunctioning of a pressure sensor that measures the pressure of the fuel within the common rail is detected.

* * * * *